United States Patent
Singh et al.

(10) Patent No.: US 12,189,602 B2
(45) Date of Patent: *Jan. 7, 2025

(54) METHODS AND SYSTEMS FOR CONNECTING DATA WITH NON-STANDARDIZED SCHEMAS IN CONNECTED GRAPH DATA EXCHANGES

(71) Applicant: Capital One Services, LLC, McLean, VA (US)

(72) Inventors: Gaurav Singh, Glen Allen, VA (US); Richard Ferrara, N Chesterfield, VA (US); Pankaj Singh, Glen Allen, VA (US); Christopher Wilcoxen, Henrico, VA (US); Felix Hidalgo, Henrico, VA (US); Rangarajan Lakshminarayanachar, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,685

(22) Filed: Sep. 14, 2023

(65) Prior Publication Data

US 2024/0004857 A1 Jan. 4, 2024

Related U.S. Application Data

(63) Continuation of application No. 17/735,989, filed on May 3, 2022, now Pat. No. 11,809,398.

(51) Int. Cl.
*G06F 16/21* (2019.01)
*G06F 16/22* (2019.01)
*G06F 16/901* (2019.01)

(52) U.S. Cl.
CPC ........ *G06F 16/2291* (2019.01); *G06F 16/212* (2019.01); *G06F 16/9024* (2019.01)

(58) Field of Classification Search
CPC . G06F 16/2291; G06F 16/212; G06F 16/9024
See application file for complete search history.

(56) References Cited

U.S. PATENT DOCUMENTS

| | | | |
|---|---|---|---|
| 2019/0179858 A1* | 6/2019 | Douze | G06F 16/2365 |
| 2019/0205773 A1* | 7/2019 | Ackerman | G06F 21/64 |
| 2020/0019558 A1* | 1/2020 | Okorafor | G06F 21/6254 |
| 2020/0074322 A1* | 3/2020 | Chungapalli | G06N 20/20 |
| 2020/0379958 A1* | 12/2020 | Riggs | G06F 16/2358 |
| 2022/0253423 A1* | 8/2022 | Neale | G06F 16/2291 |
| 2023/0179621 A1* | 6/2023 | Underwood | H04L 63/1441 726/22 |

* cited by examiner

*Primary Examiner* — Jorge A Casanova
(74) *Attorney, Agent, or Firm* — Foley & Lardner LLP

(57) ABSTRACT

Methods and systems for connecting data with non-standardized schemas in connected graph data exchanges. For example, the system generates a custom data structure corresponding to a user identifier for a user profile that includes pointers between user profile attributes (e.g., individual fields/categories within the user profile) and existing assets in a connected graph (e.g., an existing application, software profile for an application, data set, connections, etc.). The system then connects the custom data structure corresponding to the user identifier to the existing assets in the connected graph.

20 Claims, 4 Drawing Sheets

METHODS AND SYSTEMS FOR CONNECTING DATA WITH NON-STANDARDIZED SCHEMAS IN CONNECTED GRAPH DATA EXCHANGES

CROSS-REFERENCE TO RELATED APPLICATION(S)

This application is a continuation of U.S. patent application Ser. No. 17/735,989, filed May 3, 2022. The content of the foregoing application is incorporated herein in its entirety by reference.

BACKGROUND

As the world increasingly moves towards the use of electronic storage as the predominant storage method, the amount and type of data in storage continues to expand. As such, computing systems increasingly rely on ever-expanding data stores, including cloud-based data stores.

SUMMARY

As the amount of data stored increases, and the location (and types of locations) of that storage continues to diversify, coordinating data storage becomes increasingly complex. Not only do computing systems need to ensure that data is safely and securely stored, but computing systems also need to maintain efficient access to that data as well as provide navigation and searching functions. To provide these functions, a computing system may implement a data exchange. A data exchange may facilitate the process of sending, storing, and searching data. For example, a data exchange may comprise, or involve the process of, receiving data structured under a source schema and formatting it into a target schema in order to ensure that the target schema is an accurate representation of the source data. Data exchanges may then allow data to be shared between different computer systems and/or programs.

A conventional data exchange approach involves organizing and categorizing data based on a file or program. For example, a data exchange may include a file or program directory in which data related to the file or program is accessible through sub-directories. This approach provides an efficient mechanism ensuring that all data related to a given file or program is stored together and/or cross-referenced across the data exchange. This approach also provides the benefit of easy access to a file or program as well as ensuring modifications (e.g., changes to a file, updates to a program, new version releases, etc.) may be implemented at a single point and then dispersed throughout the data exchange.

However, this conventional data exchange approach creates a technical hurdle for sharing, navigating to, and searching data featuring a non-standardized schema. For example, data with a non-standardized schema may include unformatted data (e.g., data that may be spread among and/or dispersed across different files and/or programs) or alternatively categorized data (e.g., data conforming to a different schema than that of the data exchange). In such cases, each individual file and/or program directory (as well as sub-directories) may need to be queried to determine whether or not a respective file or program contains the sought-after data. One example of data with a non-standardized schema is user profile data.

For example, user profile data is typically stored separately on a user device or user terminal. In such cases, an application that requires the user profile data (e.g., based on a software profile) may call a data store on a user device or user terminal for the data. Typically, this occurs when an application is launched from the user device or user terminal. Alternatively or additionally, user profile data may be stored in a designated data file that is remote from the user device or user terminal. In such cases, an application requesting access to the user profile data (e.g., based on the software profile) will call the remote file as necessary.

While such workarounds ensure that user profile data may be accessed by files or programs within the data exchange, these nonetheless leave the user profile data outside of the data exchange ecosystem and cause user profile data to be excluded from the benefits of the data exchange such as easy, direct access to the user profile data ensuring modifications (e.g., updates to user profile data, designations of application-specific or version-specific user profile data, assignment of access rights and/or privacy settings, etc.) may be implemented at a single point and then dispersed throughout the data exchange.

This problem is exacerbated as data exchanges (and complex data storage as a whole) move away from relational database structures toward connected graph database structures. For example, a graph database (or connected graph database structure) is a database that uses graph structures for semantic queries with nodes, edges, and properties to represent and store data. A key concept of the system is the graph (or edge or relationship). The graph relates the data items in the store to a collection of nodes and edges, the edges representing the relationships between the nodes. The relationships allow data in the store to be linked together directly and, in many cases, retrieved with one operation.

Thus, not only is conventional user profile data ill-fitted for the data exchange ecosystem, user profile data fundamentally lacks characteristics to enable connections in graph database structures. For example, the aforementioned conventional systems do not individually link (e.g., provide a pointer to) a datum of user profile data to enable the user profile data to be connected with a connected graph. Instead, the connected graph would need to be connected to the software profile for an application. If that application (or the software profile for the application) is replaced, then all user profile data reference stored and/or used by the application is also replaced. Likewise, any modification to the connections to the application (or software profile for the application) in a connected graph would necessitate modifications to the underlying user profile data. Additionally, any modifications to the user profile data (e.g., updates to user profile data values, designations of application-specific or version-specific user profile data, assignment of access rights and/or privacy settings, etc.) would not be percolated upwards to the software profile for the application and/or the connections for the connected graph.

In view of this, every modification to the graph connections, applications, and software profiles for the application results in the potential for duplication of user profile data (e.g., user profile data that is the same between applications), as well as the modification of user data profile data that is unique (e.g., user profile data that is specific to an application). This leads to disconnected and multiple versions of user profile data for the same user profile (e.g., the same user). For example, even simple data points (e.g., display image, avatar, slack ID, email address, software user rights, digital assets owned, etc.) may be inconsistent, incorrect, redundant, and/or out-of-date.

To overcome this problem, the system generates a custom data structure corresponding to a user identifier for a user profile that includes pointers between user profile attributes (e.g., individual fields/categories within the user profile) and existing assets in a connected graph (e.g., an existing application, software profile for an application, data set, connections, etc.). The system then connects the custom data structure corresponding to the user identifier to the existing assets in the connected graph. The generation of the custom data structure (e.g., populated with reference data indicating relationships between user profile data and existing assets) allows for searches and queries to be run directly on the custom data structure, as opposed to a simple tag annotated to an existing data structure.

Using the connected graph, the system thus enables searches to be run on user profile data automatically when new assets are added to the connected graph. For example, if the connected graph indicates that an asset identifier for a data structure corresponds to another asset identifier for a data structure (e.g., indicating a version of the asset is being replaced, deleted, modified, etc.), the system may automatically run tasks on the user profile attributes in the custom data structure to determine if any attributes are affected. These tasks may include collecting common data for a user instead of repeated queries, contributing new data to central user profile, taking an action when a certain attribute of user profile data changes (e.g., removing access when user is terminated), etc.

In some aspects, methods and systems for connecting data with non-standardized schemas in connected graph data exchanges are described. The system may receive, via a user interface, a first user request to generate a custom data structure for user profile data, wherein the custom data structure comprises relationships between attributes of the user profile data and data exchange assets in a connected graph data exchange database. The system may retrieve a first data structure for the user profile data, wherein the first data structure comprises a first attribute for the connected graph data exchange database, and wherein the first data structure corresponds to a first node in the connected graph data exchange database. The system may retrieve a second data structure for the standardized data structure, wherein the second data structure comprises a second attribute for the connected graph data exchange database, and wherein the second data structure corresponds to a second node in the connected graph data exchange database. The system may determine that the first attribute and the second attribute correspond. The system may, in response to determining that the first attribute and the second attribute correspond, generate reference data that maps the first attribute to the second attribute. The system may generate a custom attribute to include in the custom data structure based on the reference data. The system may populate the custom data structure with the custom attribute.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
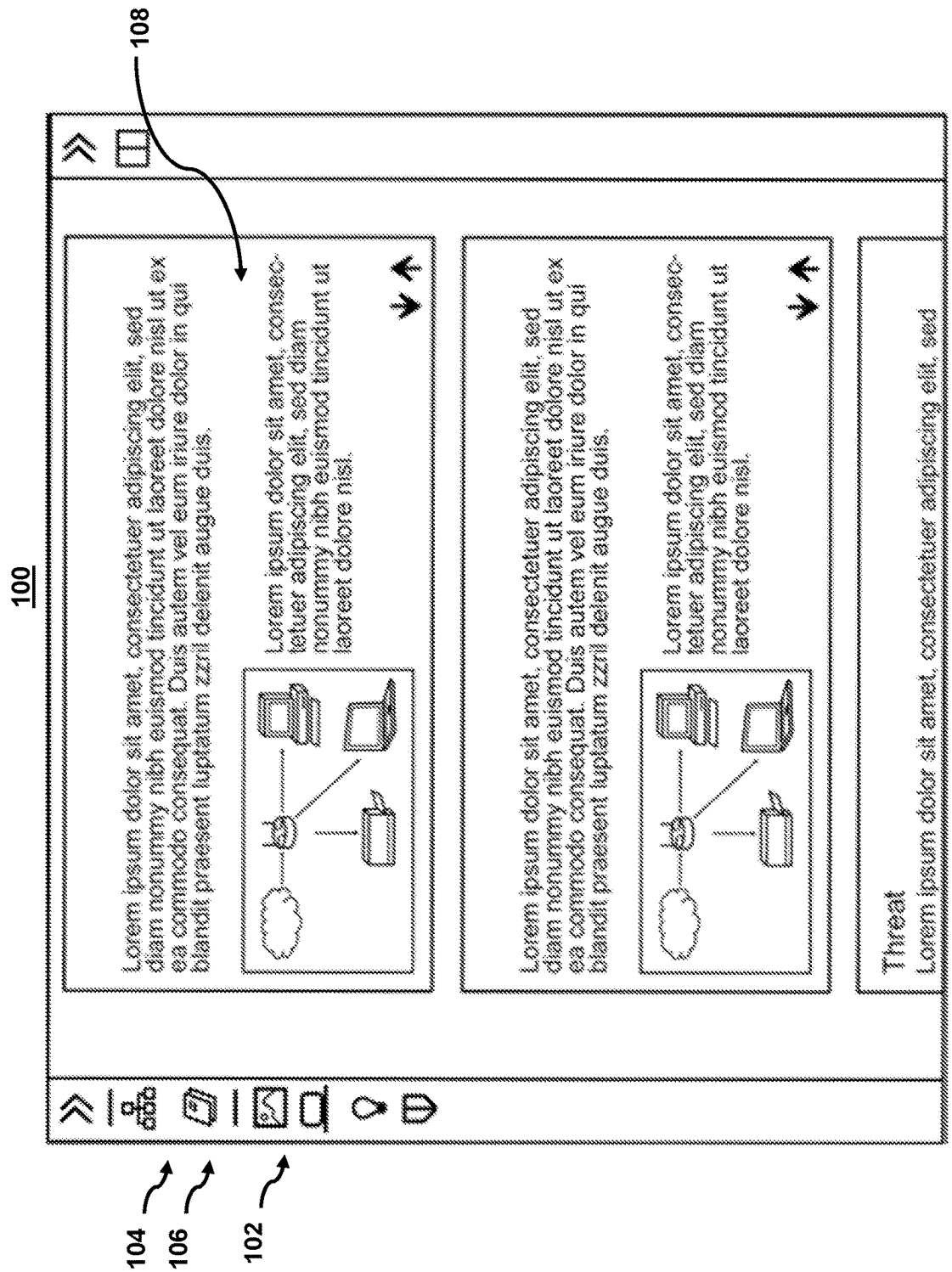
FIG. 1 shows an illustrative user interface for searching one or more data exchanges, in accordance with one or more embodiments.

FIG. 1 shows an illustrative user interface for searching one or more data exchanges, in accordance with one or more embodiments. For example, the system generates user interface 100 in response to a user request to initiate a search of one or more data exchanges, such as a user selecting a search function in a software application, the user accessing a web-page for searching one or more data exchanges, the user requesting a search using a voice command, and other means for requesting search functionality for one or more data exchanges.

As referred to herein, a "user interface" may comprise a human-computer interaction and communication in a device, and may include display screens, keyboards, a mouse, and the appearance of a desktop. For example, a user interface may comprise a way a user interacts with an application or a website. As described herein, the application and/or website may comprise a data exchange system as described herein. The data exchange system may comprise a plurality of data exchange contributions. For example, the system may comprise user profile data comprising a connected graph data exchange database, wherein the connected graph data exchange database comprises a graph-based hierarchy of data exchange contributions for the user profile data, and wherein the graph-based hierarchy of data exchange contributions comprises data exchange contributions from a plurality of sources. For example, the plurality of sources may comprise different authors, organizations, and/or other entities.

User interface 100 may allow users to enter information about a data exchange system and/or data exchange contribution (e.g., via icon 102). For example, a data exchange contribution may include any data or content added to and/or accessed by the data exchange. A data exchange contribution may include an attribute. An attribute may include any information that describes the contribution, such as a topic or category of the contribution, including information used to populate an attribute for the contribution and/or otherwise describe a data structure and/or model structure for a data exchange contribution. For example, the attribute may indicate how a contribution is indexed and/or archived in a connected graph data exchange database and/or data exchange system. For example, each data exchange contribution may correspond to content and/or an attribute. For example, the attribute may provide an attribute that provides a fully semantic data model used to enable data entered into the system to be meaningfully applied across different data exchange application domain contexts (e.g., provide connections between different nodes of the connected graph data exchange database). In some embodiments, the system may include a custom attribute, which may be an attribute of a custom data structure. The custom attribute may comprise reference data as described herein.

The data exchange system may arrange and/or organize the data exchange contributions into a graph-based hierarchy. For example, the system may organize the various data exchange contributions into a system in which data exchange contributions are organized one above the other according to function. The hierarchy may comprise a plurality of data exchange contributions arranged in series and/or in parallel in which the inputs and outputs are intertwined such that information from one or more data exchange contributions may be received from, and/or used by, one or more other data exchange contributions.

Each data exchange contribution may comprise content such as software applications, instructions, and/or other information used by a data exchange system. Each data exchange may also include an attribute and/or other characteristics about a contribution that describes the data exchange contributions and/or portions of the data exchange contributions. In some embodiments, the attribute may include information populated in a data structure and/or model structure as described herein, as well as the input and/or outputs that are processed by a data exchange system and/or one or more data exchange contributions. For example, the attribute may represent a fully semantic data model used to enable data entered into the system to be meaningfully applied across different data exchange application domain contexts.

In some embodiments, the system may use the content such as contribution attributes (e.g., ontologies and/or values associated with a category of an attribute) to organize data exchange contributions into the hierarchy. The hierarchy may comprise a connected graph data exchange database as described herein. The data exchange may comprise a complex structured and/or unstructured set of information used by a computer system to enable a data exchange system. While embodiments are described herein with respect to a connected graph data exchange database, these embodiments may alternatively or additionally use a hierarchical or relational database structure to link different content (e.g., data exchange contributions) within the data exchange system. For example, a hierarchical database structure may be a structure in which data is organized into a tree-like structure. For example, the data may be stored as records which are connected to one another through links. A record may be a collection of fields, with each field containing only one value (e.g., content). The type of a record may define which fields the record contains. In some embodiments, the tree structure may comprise a node-link structure in which a parent node links to child nodes, nested sets (e.g., in relational databases), radial trees, and/or other organizational systems.

Each data exchange contribution may comprise a component of the data exchange. For example, "components" of a data exchange may include portions of the data exchange (e.g., corresponding to one or more nodes of the connected graph data exchange database) that provide modeling for a specific domain application, address specific contributions, provide a specific function, and/or are otherwise distinct from other portions of the data exchange.

When the system receives a user request to access user interface 100, the system accesses the user's credentials from a profile associated with the user. For example, when the system receives a request from the user to access user interface 100, the system accesses the profile of the user stored in a data storage location to obtain credentials associated with the user. Credentials associated with the user may include a user name, a user role, a user business unit, a list of user team memberships, a user organization, a search history associated with the user, and other similar credentials.

User interface 100 includes text input 104, search input 104, search criteria 106, and content 108. In some embodiments, user interface 100 may also include other user interface elements, such as additional text boxes, additional fields, additional input mechanisms, and other elements. Text input 104 receives input from a user, and the system receives the input from text input 104. The system may then use the received input as a search string. The system may receive a manual user input to text input 104, for example, by receiving a manual input from a user using a mouse and keyboard to select text input 104 and enter a text string into text input 104. In other embodiments, the system can populate text input 104 automatically, such as populating text input 104 with a search string in response to a user selecting a specific hyperlink or user interface element, in response to receiving a voice command from the user, or in response to receiving another form of automatic input to text input 104.

Search input 104 may be a selectable user interface element. When the system receives a selection to initiate search input mechanism, the system may initiate a search of the data exchanges based on a received search string, such as a search string received by the system as input into text input 104. In some embodiments, text input 104 can be a manually-selectable button or other similar user interface element. In some embodiments, the system may receive an automatic actuation of text input 104, such as detecting a user actuating a particular key on a keyboard, selecting search input 104 on a touch screen or other human-machine interface, in response to receiving a voice command from the user, and other suitable automatic actuation methods.

Search criteria 106 can be a manually-selectable input mechanism, such as a button. The system may receive an actuation of the search criteria 106 and, in response, may generate for display a new user window or dialog box, a new view in user interface 100, a new tab in user interface 100, or another suitable graphical user interface presentation element. The newly displayed graphical user interface presentation element can include additional fields or other user interface elements. The system may receive input from the user at the additional fields or other user interface elements and modify the search based on the received input, such as limiting the search to a particular data exchange or subsection of the data exchange, limiting the search to particular types of digital assets, specifying specific business units or digital asset authors to search, and other filters or refining factors for the search.

Content 108 may display returned search results. For example, the system may perform a search and receive, from the data exchange, a list of search results matching the search string. The system may then provide the list of search results to the content 108 for display. In some embodiments, content 108 may display the most relevant search results at the top of a list of returned search results. In some embodiments, the system may receive a selection of one or more displayed search results (e.g., may receive a manual selection in response to a user clicking on one of the displayed search results). In response to receiving the selection of the one or more displayed search results, the system may provide additional details about the selected one or more displayed search results, such as asset owner, one or more pieces of asset functionality, asset data, asset type, and other additional details, to content 108 for display.

In some embodiments, content 108 may comprise a notification and/or a recommendation. For example, the system may provide numerous types of notifications and/or recommendations as described herein. In some embodiments, user interface 100 (or the recommendation data therein) may be presented as a status page. The status page may include summary information about a data exchange system, data exchange contribution, comparison data, reference data, and recommendation data as well as issues, stakeholders, responsible contributors, etc. The status page may also include queries that may be performed.

As referred to herein, "reference data" includes data that maps a first attribute to the second attribute. For example, reference data may comprise a pointer, link, and/or other database cross-reference information. For example, the system may use reference data to define how first attribute keywords are mapped, the second attribute keywords and/or how first attributes are mapped to second attributes. That is, the reference data may be used to map relationships (e.g., edges in a graph database) between data, data entity attributes, and/or other characteristics of the data. For example, in some embodiments, the reference data may comprise an edge (or data defining the edge) in a connected graph data exchange database. The reference data may further include data that connects (or links, points to, etc.) a third node corresponding to a first attribute and a fourth node corresponding to a second attribute. The reference data may then be used to generate a custom attribute for inclusion in a custom data structure.

As opposed to a simple tag annotated to an existing data structure, the generation of the custom data structure (e.g., populated with reference data indicating relationships between user profile data and existing assets) allows for searches and queries to be run directly on the custom data structure.

For example, the reference data may define the link between a given attribute in user profile data and the one or more applications, software profiles, etc., within the data exchange. Furthermore, as opposed to conventional tags, the reference data may include descriptions of both the attributes of the user profile data and the existing asset, as well as the code defining the relationship and/or providing the linking mechanism. For example, the reference data may include an identifier for the user profile, the user profile data type, the code required for defining the relationship, an identifier for the existing asset, an application type, an attribute type, etc. The system may thus run searches and queries on this data, which would not exist in conventional systems.

Figure 2:
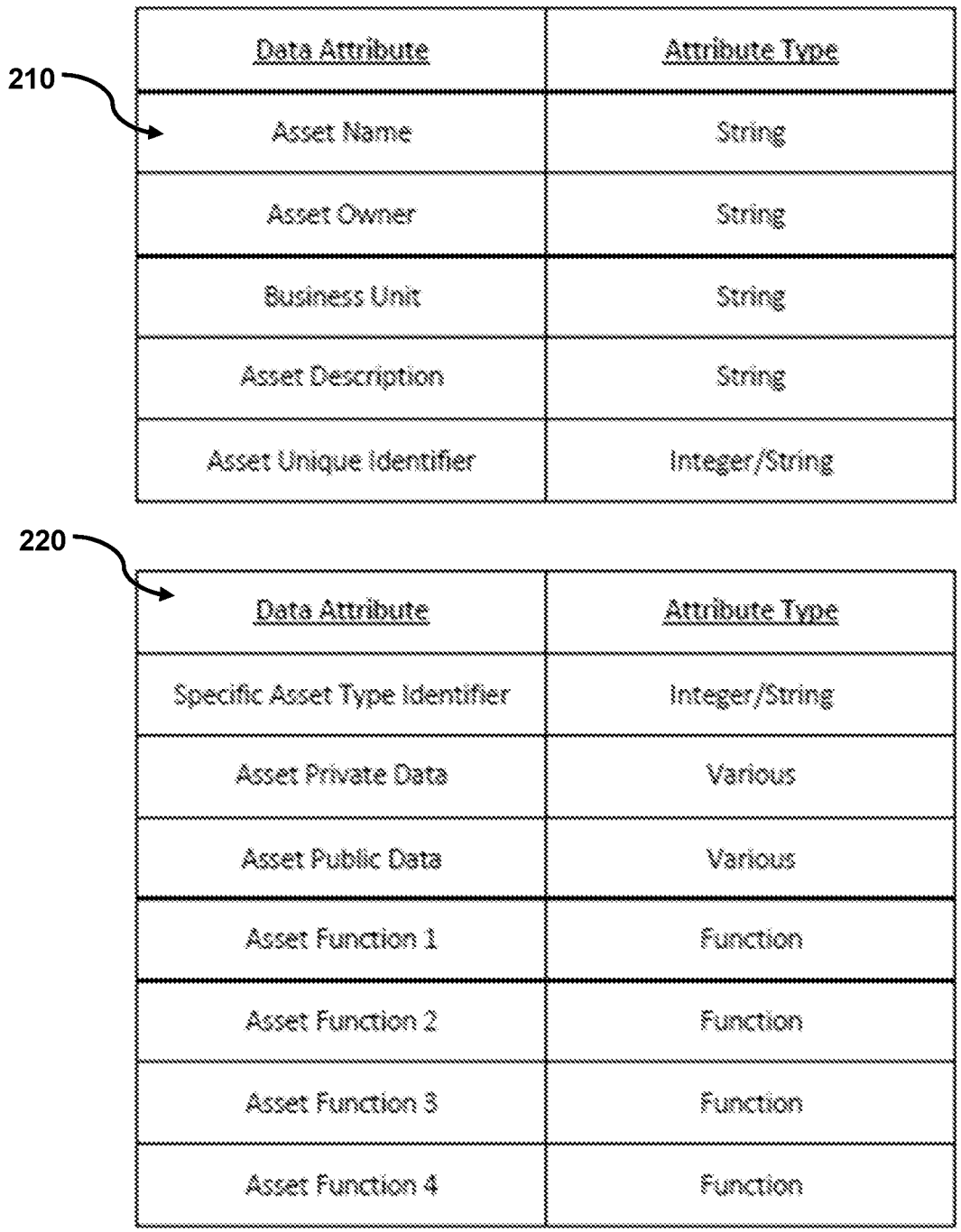
FIG. 2 shows illustrative architecture for data structures in a data exchange, in accordance with one or more embodiments.

FIG. 2 shows illustrative architecture for data structures in a data exchange, in accordance with one or more embodiments. For example, a data exchange may be a service that enables users to search and access various digital assets and data associated with digital assets. For example, the data exchange may include one or more digital assets. In some embodiments, the digital asset may represent various software interfaces that allow users to quickly access data and specific functionality associated with that data, especially in computing systems that have large amounts of data with which to work, such as data lakes. The digital asset may additionally or alternatively include application programming interfaces ("APIs"), data workflows, data protocols, software applications, data sets, user profiles, and/or other suitable software interfaces.

Each digital asset may have a unique asset type associated with the digital asset. For example, even though two digital assets may both be APIs or data protocols, the digital assets may access completely different data and perform completely different functionality, such as an API for accessing weather data and an API for accessing location data. These two assets may have two different and unique asset types, even if both assets are APIs.

Each digital asset may have numerous attributes arranged in a data structure. For example, a first digital asset may include data structure 210, which may list a plurality of attributes. The data structure may have a standardized schema that is universal to all types of digital assets. A schema is a formal definition of the structure of stored data in a database. A schema can include data attributes, data types of attributes, fields, data formats for each attribute or field, relationships between data, and other properties that provide structure or functionality to data stored in a database. The standardized schema is a schema that is associated with every type of digital asset created and stored in the data exchange. For example, every digital asset, regardless if the asset is an API, a data workflow, a data protocol, or other software interface, may include a standard set of data attributes such as asset name, asset owner, asset business unit, asset identifier, and other suitable attributes, along with a data type of each of the data attributes. For example, an asset name data attribute may have a data type of string, while an asset identifier data attribute may have a data type of integer, string, hash code, or another data type that can be used to create a unique identifier for the data attribute. In some embodiments, the data type of each data attribute may be a mixed data type (e.g., both a string and integer) or may accept multiple data types for the data attribute.

The standardized schema may also define a data format for each data attribute. For example, for an asset business unit data attribute, the data format may be "BUSINESS UNIT NAME—BUSINESS UNIT ID NUMBER." When a new digital asset is created, the system may prompt a creator of the new digital asset for this information and receive a user input indicating the name of the business unit associated with the new digital asset and an identification number associated with the business unit associated with the new digital asset.

The standardized schema may also define one or more relationships between data attributes or relationships between the digital asset and one or more other data objects. Relationships (e.g., edges in a graph database) between data attributes may govern what values can be used to populate a data attribute based on the value of a different data attribute, what data attributes are publicly accessible or not publicly accessible based on the value of a particular data attribute, what data formats may be available for particular attributes based on the value of a different data attribute, and other similar functionality. For example, if a digital asset has an asset creator data attribute with the value "John Smith," a relationship between the asset creator data attribute and an asset business unit data attribute may require that the asset business unit data attribute must have a value of a business unit John Smith works in, such as "software applications." This information may be obtained by the system from a separate database, such as a database storing information about employees in a company utilizing a data exchange.

Relationships between the digital asset and one or more other data objects may govern a number of data objects that can access data managed by the digital asset, types of data objects that can access data managed by the digital asset, required values of attributes of data objects that request to access the data managed by the digital asset, and other similar functionality. For example, a relationship between the digital asset and another data object may require that the other data object have a value of an asset business number attribute and be the same value as a value of the asset business number attribute of the digital asset, before allowing access to the digital asset. The system receives the request to access the digital asset from the other data object, determines if the other data object can access the digital asset, and allows or denies access based on the comparison.

FIG. 2 also shows another data structure (e.g., data structure 220). Data structure 220 may comprise a second set of attributes. Furthermore, data structure 220 may comprise a non-standardized schema or data structure. For example, data structure 220 may use a schema specific to the asset type. For example, data structure 220 may comprise user profile data. Like the standardized schema described above, the specific schema provides a formal definition for the structure of the data. However, the system receives a manual definition of the specific schema from the user for the asset type that is being created. The specific schema may include data attributes, data types of attributes, fields, data formats for each attribute or field, relationships between data, and other properties that provide structure or functionality to data stored in a database for the unique asset type. In contrast to the standardized schema that is universal to all asset types, the specific schema is defined by the creator and includes unique data attributes and functionality associated with the digital asset type. For example, a digital asset for accessing and using weather data may have a specific schema with data attributes such as requested location for weather data, requested timeframe for weather data, requested type(s) of weather data, and other weather data-specific data attributes. The specific schema may also define the functionality of the digital asset, such as providing a requestor function for requesting weather data for a particular location, timeframe, and similar parameters.

As described above, these unique properties of the specific schema are defined by a creator of the digital asset during the creation process and are not shared between all asset types. Instead, these properties are unique to the asset type being created. By defining a specific schema for each asset type, creators of assets may create custom, non-homogenous functionality for each asset type while maintaining a shared set of common attributes (the standardized schema), which aids in searching the data exchange for different asset types.

The system receives a request to create a new digital asset from the user. In some embodiments, the request may include values and functionality defined by the user for the new digital asset, such as values for data attributes of the standardized schema, values for data attributes of the specific schema and functionality associated with the specific schema, and the like. The system may additionally create custom data structures to link attributes about the new digital assets to one or more existing assets in the data exchange. In some embodiments, the system may generate for presentation an asset creation user interface. The user may input values for data attributes of the standardized schema into fields of the asset creation user interface. The user may also input the specific schema and associated data attributes and functionality into the asset creation user interface. For example, the user may input the asset name and asset business unit into fields of the asset creation user interface and then use one or more input mechanisms to select data attributes, data types of the data attributes, functionality for the asset, values for the data attributes, and other properties of the digital asset. The system may then receive the user inputs and generate a new digital asset for storage in a data exchange based on the user inputs.

In some embodiments, the connected graph data exchange database may comprise a knowledge base of data enriched with semantic annotations (e.g., attributes) to facilitate association of threat with architectural components and data flows. These semantic annotations (e.g., attributes) may be represented in ontologies for a particular data exchange contribution and/or data structure corresponding to a data exchange contribution and/or a given node of the connected graph data exchange database. The connected graph data exchange database and associated API (e.g., API 350 (FIG. 3)) allows for the data exchange system to incorporate data exchange intelligence and present users with the most relevant data for a given set of components and data flows.

The connected graph data exchange database (and the data exchange system that incorporates the connected graph data exchange database) links and integrates data relevant to data exchange into a single knowledge base and enriches them with semantic annotations relevant to architecture and data-flow concepts to allow automated and intelligent identification of data most relevant to a given software application. Through the provided API, applications can leverage the connected graph data exchange database (and the data exchange system that incorporates the connected graph data exchange database) to automate the process of identifying data relevant to a given software architecture, providing navigation and search functionality, and providing data exchange intelligence to the application. Continuous integration of newly identified data and mitigations means the connected graph data exchange database (and the data exchange system that incorporates the connected graph data exchange database) facilitates the sharing of new data exchange expertise across products, users, and organizations.

It should be noted that as described herein, the use of artificial intelligence ("AI") such as NLP and machine learning may be used interchangeably and/or embodiments described using NLP may also use machine learning. For example, AI may be used as an umbrella term for both machine learning and NLP. AI may comprise any learning by a machine (e.g., learning that simulates that human intelligence) and/or the mimicking of cognitive capabilities, like learning from examples and solving problems. In some embodiments, NLP may be used to understand and translate human language (e.g., via translation, keyword extraction, topic classification, etc.). Machine learning may be used to apply algorithms that teach machines how to automatically learn and improve from experience without being explicitly programmed. In some embodiments, the system may combine NLP and machine learning model (e.g., collectively referred to as machine learning model) to perform one or more of the tasks described herein.

For example, in some embodiments, the system may use a connected graph data exchange database (e.g., featuring NLP) for topic analysis (e.g., organizing and understanding large collections of text data). The system may assign attributes as "tags" or categories according to each individual attribute (e.g., semantic annotations), which may correspond to the data structures described herein. For example, NLP may be used to interpret human language to allow for patterns to be detected by the system and to determine semantic structures within texts using NLP topic modelling, which is an unsupervised machine learning technique in which the model may infer patterns and clusters similar expressions without needing to define topic tags or train data beforehand. It should also be noted that in some embodiments, the system may use both supervised training and/or a combination of supervised and unsupervised training.

The system may actively query the attributes between different data exchange contributions using NLP to identify similar attributes. In some embodiments, the machine learning model may be trained to identify attributes in the data exchange contributions. For example, the machine learning model may be trained to identify keywords, semantic annotations, tags, and/or attributes in the model structures.

Figure 3:
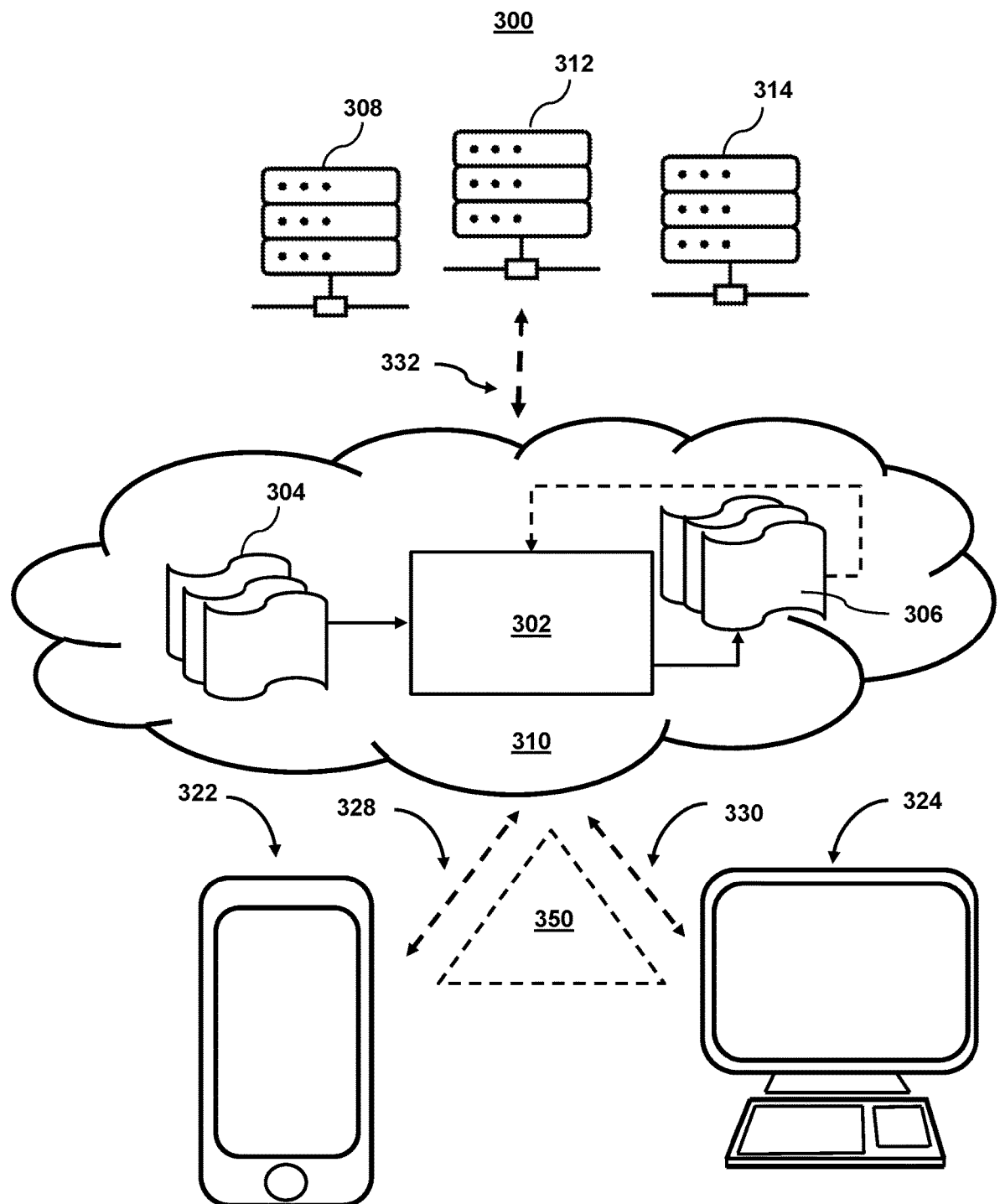
FIG. 3 depicts an illustrative system for connecting data with non-standardized schemas in connected graph data exchanges, in accordance with an embodiment.

FIG. 3 shows illustrative system components for searching a data exchange for information on assets with non-homogenous functionality and non-standardized data descriptions using credentials corresponding to users conducting searches, in accordance with one or more embodiments. For example, a system may represent the components used for searching a data exchange, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., search inputs, responses, queries, and/or notifications).

Additionally, as mobile device 322 and user terminal 324 are shown as touchscreen smartphones, these displays also act as user input interfaces. It should be noted that in some embodiments, the devices may have neither user input interface nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to searching a data exchange.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. This user data may be collected in a user data profile for a user. For example, the user profile data may include user data that the system has collected about the user through prior interactions, both actively and passively. For example, the user data may describe one or more characteristics of a user, a user device, one or more search queries input by the user, one or more digital assets owned by or associated with the user, one or more digital assets previously accessed by the user, or other information related to the user's access of the data exchange. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based I/O circuitry configured to display alternative content.

Cloud components 310 may include first data source 308, second data source 312 and crowdsource database 314. First data source 308 may correspond to a data source of a first entity (e.g., a first crowdsourced user). First data source 308 may have a first native data structure and/or first attribute. The first native data structure and/or first attribute may correspond to a software architecture, data flow, threat, and/or mitigation technique corresponding to a first contribution. Second data source 312 may correspond to a data source of a second entity (e.g., a second crowdsourced user). Second data source 312 may have a second native data structure and/or second attribute. The second native data structure and/or second attribute may correspond to a software architecture, data flow, threat and/or mitigation technique corresponding to a second contribution. Crowdsource database 314 may correspond to a crowdsource database housing the data exchange system, which may be distinct from the first and second entity. Crowdsource database 314 may have a native hierarchical data structure (e.g., a connected graph data exchange database) and/or native attribute. Furthermore, the system may use machine learning to generate a hierarchical data structure for crowdsource database 314 based on first data source 308 and second data source 312 even though first data source 308 and second data source 312 may feature different attributes. In some embodiments, first data source 308, second data source 312, and crowdsource database 314 may correspond to data source 202, data source 206, and crowd database 204, respectively.

Cloud components 310 may also include model 302, which may be a connected graph data exchange database (e.g., as described in FIG. 2) and/or AI model, that generates a connected graph data exchange database. Model 302 may take inputs 304 and provide outputs 306. The inputs may include multiple datasets such as a training dataset and a test dataset. Each of the plurality of datasets (e.g., inputs 304) may include data subsets related to hierarchical data structures for the crowdsource database, attributes, native data, and attributes. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known data structure. The system may then train the first machine learning model to classify inputted data structures to known data structures of hierarchical data structures (e.g., to determine similarities between different semantic annotations and/or other attributes).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, model 302 may predict one or more attributes and may include a probability that the attributes correspond. Attributes may include one or more words, phrases, values, or other portions of search strings that are used in a search process. For example, the system may determine that particular characteristics are more likely to be indicative of a particular attribute or that one or more attributes correspond. In some embodiments, the model (e.g., model 302) may automatically perform actions (e.g., generate a notification, generate reference data, etc.) based on outputs 306. In some embodiments, the model (e.g., model 302) may not perform any actions. The output of the model (e.g., model 302) may be used to generate for display, on a user interface, a notification related to an attribute, reference data, a custom data structure, etc.

The machine learning model may determine keyword similarities and/or semantic closeness between keywords in the first and second attributes, respectively, or the first and second data structures. For example, the system may then retrieve a first attribute keyword for the first data structure and may retrieve a second attribute keyword for the second data structure. For example, the system may identify a keyword of a topic (or category) under which the first data structure indexes and/or organizes in the connected graph data exchange database (e.g., based on a set of relationships between attributes of the user profile data and data exchange assets). Additionally, the system may identify a keyword of a topic (or category) under which the second data structure indexes and/or organizes in the connected graph data exchange database (e.g., based on a set of relationships between attributes of the user profile data and data exchange assets). The system may then determine a first similarity between the first attribute keyword and the second attribute keyword. For example, the system may determine a vector space distance between two textual entities (keywords, hashes, documents, etc.). The system may then compare the first similarity to a threshold similarity. The system may then determine that the first attribute keyword and the second attribute keyword correspond based on the first similarity equaling or exceeding the threshold similarity (and not correspond otherwise). The system may then populate the data exchange contribution and the node of the data exchange system in response to determining that the first attribute keyword and the second attribute keyword correspond.

System 300 also includes API layer 350. API layer 350 may allow the system to generate recommendations across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
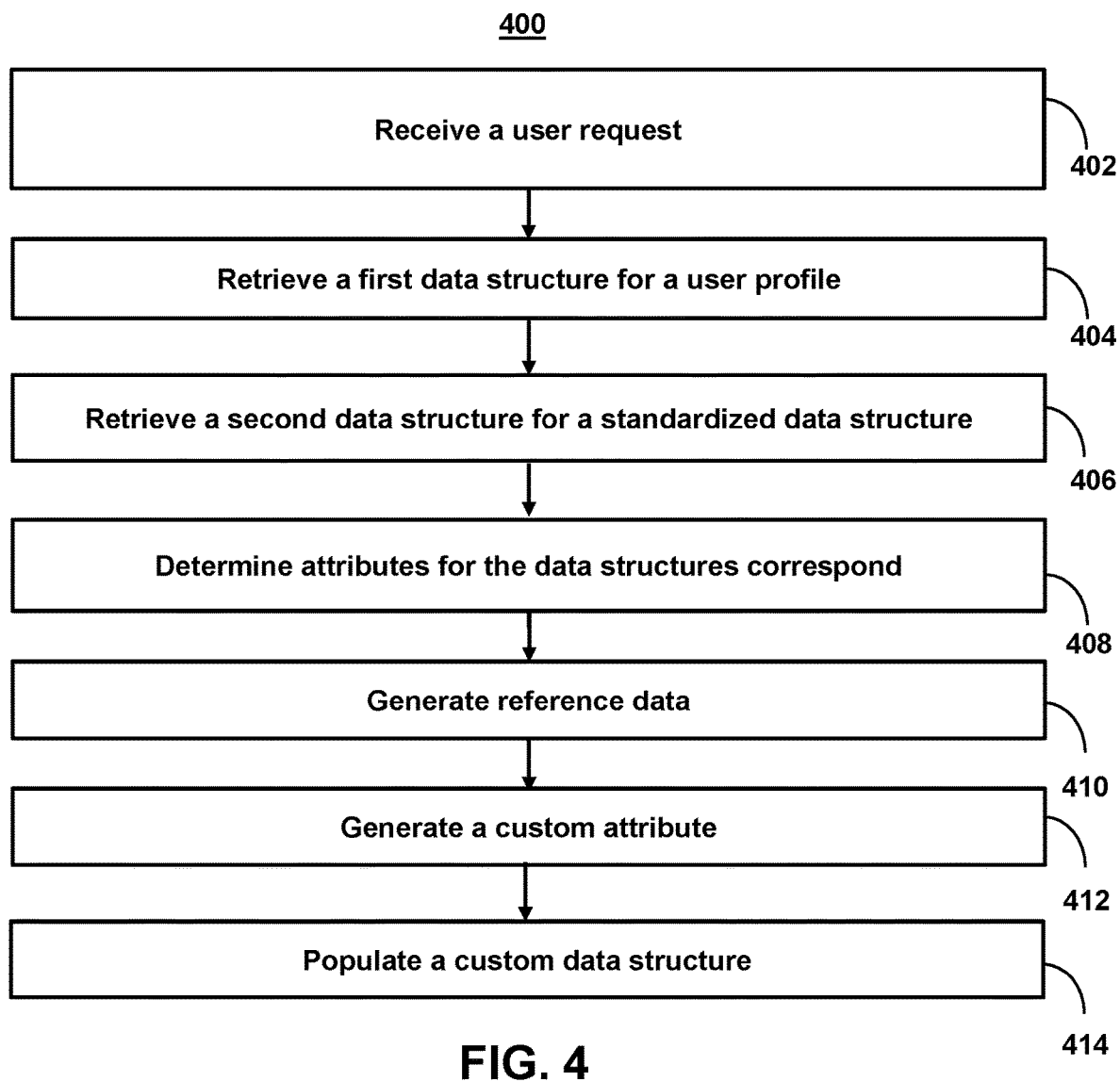
FIG. 4 depicts a process for connecting data with non-standardized schemas in connected graph data exchanges, in accordance with an embodiment.

FIG. 4 depicts a process connecting data with non-standardized schemas in connected graph data exchanges. For example, FIG. 4 shows process 400, which may be implemented by one or more devices. The system may implement process 400 to generate one or more of the user interfaces (e.g., as described in FIG. 1).

At step 402, process 400 receives (e.g., using control circuitry of one or more components of system 300 (FIG. 3)) a user request. For example, the system may receive, via a user interface, a first user request to generate a custom data structure for user profile data, wherein the custom data structure comprises relationships between attributes of the user profile data and data exchange assets in a connected graph data exchange database.

In some embodiments, in response to receiving the user request to generate the custom data structure, the system may determine that the custom data structure comprises the first data structure and the second data structure. In response to determining that the custom data structure comprises the first data structure and the second data structure, the system may access a first remote issue link to a first server housing the first data structure and a second remote issue link to a second server housing the first data structure.

At step 404, process 400 receives (e.g., using control circuitry of one or more components of system 300 (FIG. 3)) a first data structure for a user profile. For example, the system may retrieve a first data structure for the user profile data, wherein the first data structure comprises a first attribute for the connected graph data exchange database, and wherein the first data structure corresponds to a first node in the connected graph data exchange database.

At step 406, process 400 retrieves (e.g., using control circuitry of one or more components of system 300 (FIG. 3)) a second data structure for the standardized data structure. For example, the system may retrieve a second data structure for the standardized data structure, wherein the second data structure comprises a second attribute for the connected graph data exchange database, and wherein the second data structure corresponds to a second node in the connected graph data exchange database.

The attributes may describe user profile data and/or user profile data used by an application. For example, the first attribute describes a first type of user identifier, and the second attribute describes a second type of user identifier. The reference data maps the first type of user identifier to the second type of user identifier. Additionally or alternatively, the first attribute describes a first type of user setting, and the second attribute describes a second type of user setting. The reference data maps the first type of user setting to the second type of user setting. For example, the connected graph data exchange database may relate data items in a data store to a collection of nodes and edges, wherein the nodes represent data items in the data store, and wherein the edges represent relationships between the nodes. The reference data may represent an edge in the connected graph data exchange database connecting a third node corresponding to the first attribute and a fourth node corresponding to the second attribute. The third and fourth node may be distinct from a first node corresponding to a first data structure and a second node corresponding to a second data structure.

At step 408, process 400 determines (e.g., using control circuitry of one or more components of system 300 (FIG. 3)) that attributes for the data structures correspond. For example, the system may determine that the first attribute and the second attribute correspond. In some embodiments, the system may compare attributes to select nodes (e.g., nodes that point directly to an attribute) at which to generate reference data (e.g., that may define a custom attribute in a custom data structure) and/or to determine that attributes correspond. For example, the system may retrieve first content from the first attribute. The system may retrieve second content from the second attribute. The system may determine a semantic closeness between the first content and the second content. The system may compare the semantic closeness to a threshold semantic closeness. The system may determine that the first content and the second content correspond based on the semantic closeness equaling or exceeding the threshold semantic closeness. The system may determine that the first attribute and the second attribute correspond based on the semantic closeness equaling or exceeding the threshold semantic closeness. The system may also determine to link the user profile data and the standardized data structure (or the attributes thereof) at a node (or across nodes) based on the semantic closeness equaling or exceeding the threshold semantic closeness.

Additionally or alternatively, the system may retrieve first content from the first attribute. The system may determine a keyword in the first content. The system may compare the keyword to a list of keywords corresponding to the second attribute. The system may determine that the first attribute and the second attribute correspond based on comparing the keyword to the list of keywords corresponding to the second attribute. The system may determine to link the user profile data and the standardized data structure (or the attributes thereof) at a node (or across nodes) based on comparing the keyword to the list of keywords corresponding to the second attribute.

At step 410, process 400 generates (e.g., using control circuitry of one or more components of system 300 (FIG. 3)) reference data. For example, the system may, in response to determining that the first attribute and the second attribute correspond, generate reference data that maps the first attribute to the second attribute. The system may, in response to generating the relationship, determine reference data, for the relationship, that maps the first attribute to the second attribute. For example, the system may map semantic relationships between data characteristics, data entity attributes, and relationships between data instances in order to update the data exchange system. In some embodiments, determining the reference data may further comprise determining the first attribute, determining the second attribute, and determining a rule set for automatically mapping the first attribute to the second attribute. In some embodiments, the system may receive a user edit to the reference data and store the edited reference data.

At step 412, process 400 generates (e.g., using control circuitry of one or more components of system 300 (FIG. 3)) a custom attribute for the custom data structure. For example, the system may generate a custom attribute for including in the custom data structure based on the reference data. For example, the system may generate, using control circuitry, a custom attribute for the custom data structure at third (and/or fourth) node based on the first data structure and the second data structure, wherein the relationship is shared by the first data structure and the second data structure in the custom data structure.

At step 414, process 400 populates (e.g., using control circuitry of one or more components of system 300 (FIG. 3)) a custom data structure. For example, the system may populate the custom data structure with the custom attribute. The system may use the custom data structure to perform numerous functions. For example, the system may receive, via the user interface, a second user request to update the user profile data. The system may, in response to receiving the second user request, retrieve the custom data structure. For example, as opposed to updating the user profile data or relying solely on the first data structure, the system may reference the custom data structure. Additionally or alternatively, the system may receive, via the user interface, a third user request to update the second data structure. The system may, in response to receiving the third user request, update the reference data.

It is contemplated that the steps or descriptions of FIG. 4 may be used with any other embodiment of this disclosure. In addition, the steps and descriptions described in relation to FIG. 4 may be done in alternative orders, or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, via a user interface, a first user request to generate a custom data structure for user profile data, wherein the custom data structure comprises relationships between attributes of the user profile data and data exchange assets in a connected graph data exchange database; retrieving a first data structure for the user profile data, wherein the first data structure comprises a first attribute for the connected graph data exchange database, and wherein the first data structure corresponds to a first node in the connected graph data exchange database; retrieving a second data structure for the standardized data structure, wherein the second data structure comprises a second attribute for the connected graph data exchange database, and wherein the second data structure corresponds to a second node in the connected graph data exchange database; determining that the first attribute and the second attribute correspond; in response to determining that the first attribute and the second attribute correspond, generating reference data that maps the first attribute to the second attribute; generating a custom attribute for including in the custom data structure based on the reference data; and populating the custom data structure with the custom attribute.
2. The method of embodiment 1, wherein the method is for connecting data with non-standardized schemas in connected graph data exchanges.
3. The method of any one of the preceding embodiments, wherein the first attribute describes a first type of user identifier, and wherein the second attribute describes a second type of user identifier, and wherein the reference data maps the first type of user identifier to the second type of user identifier.

4. The method of any one of the preceding embodiments, wherein the first attribute describes a first type of user setting, and wherein the second attribute describes a second type of user setting, and wherein the reference data maps the first type of user setting to the second type of user setting.

5. The method of any one of the preceding embodiments, further comprising: receiving, via the user interface, a second user request to update the user profile data; and in response to receiving the second user request, retrieving the custom data structure.

6. The method of any one of the preceding embodiments, further comprising: receiving, via the user interface, a further user request to update the second data structure; and in response to receiving the further user request, updating the reference data.

7. The method of any one of the preceding embodiments, further comprising: in response to receiving the user request to generate the custom data structure, determining that the custom data structure comprises the first data structure and the second data structure; and in response to determining that the custom data structure comprises the first data structure and the second data structure, accessing: a first remote issue link to a first server housing the first data structure; and a second remote issue link to a second server housing the first data structure.

8. The method of any one of the preceding embodiments, wherein generating the reference data further comprises: determining the first attribute; determining the second attribute; and determining a rule set for automatically mapping the first attribute to the second attribute.

9. The method of any one of the preceding embodiments, further comprising: retrieving first content from the first attribute; retrieving second content from the second attribute; determining a semantic closeness between the first content and the second content; comparing the semantic closeness to a threshold semantic closeness; determining that first content and the second content correspond based on the semantic closeness equaling or exceeding the threshold semantic closeness; and determining that the first attribute and the second attribute correspond based on the semantic closeness equaling or exceeding the threshold semantic closeness.

10. The method of any one of the preceding embodiments, further comprising: retrieving first content from the first attribute; determining a keyword in the first content; comparing the keyword to a list of keywords corresponding to the second attribute; and determining that the first attribute and the second attribute correspond based on comparing the keyword to the list of keywords corresponding to the second attribute.

11. The method of any one of the preceding embodiments, further comprising: receiving a user edit to the reference data; and storing the edited reference data in the custom data structure.

12. A tangible, non-transitory, machine-readable medium storing instructions that, when executed by a data processing apparatus, cause the data processing apparatus to perform operations comprising those of any of embodiments 1-101.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A system for connecting data with non-standardized schemas in connected graph data exchanges, comprising:
    cloud-based memory configured to:
        store a first data structure for user profile data, wherein the first data structure comprises a first attribute for a connected graph data exchange database, and wherein the first data structure corresponds to a first node in the connected graph data exchange database, wherein the connected graph data exchange database relates data items in a data store to a collection of nodes and edges, wherein nodes, in the collection of nodes, represent the data items in the data store, and wherein the edges represent relationships between the nodes; and
        store a second data structure for a standardized data structure, wherein the second data structure comprises a second attribute for the standardized data structure;
    cloud-based control circuitry configured to:
        receive a first user request to generate a custom data structure for the user profile data, wherein the custom data structure comprises relationships between attributes of the user profile data and data exchange assets in the connected graph data exchange database, and wherein the custom data structure comprises a plurality of fields;
        generate reference data that maps the first attribute to the second attribute in response to determining that the first attribute and the second attribute correspond, wherein the reference data represents an edge in the connected graph data exchange database connecting a third node corresponding to the first attribute and a fourth node corresponding to the second attribute;
        generate a custom attribute for including in the custom data structure based on the reference data; and
        populate the custom data structure with the custom attribute, wherein the custom attribute represents a value of a field of the plurality of fields;
        receive a second user request to update the second data structure; and
        update the reference data in response to receiving the second user request; and
    cloud-based input/output circuitry configured to:
        generate for display, on a user interface, a notification based on updating the reference data.

2. A method for connecting data with non-standardized schemas in connected graph data exchanges, comprising:
    receiving, via a user interface, a first user request to generate a custom data structure for user profile data, wherein the custom data structure comprises relationships between attributes of the user profile data and data exchange assets in a connected graph data exchange database, wherein the connected graph data exchange database relates data items in a data store to a collection of nodes and edges, wherein nodes, in the collection of nodes, represent the data items in the data store, and wherein the edges represent relationships between the nodes;
    generating a custom attribute for including in the custom data structure by generating reference data that maps a first attribute to a second attribute, wherein the first attribute is retrieved from a first data structure for the user profile data, wherein the first data structure comprises the first attribute for the connected graph data exchange database, and wherein the first data structure corresponds to a first node in the connected graph data exchange database, and wherein the second attribute is retrieved from a second data structure for a standardized data structure, wherein the second data structure comprises the second attribute for the connected graph data exchange database, and wherein the second data structure corresponds to a second node in the connected graph data exchange database;

receiving, via the user interface, a second user request to update the second data structure in response to receiving the second user request, updating the reference data; and generating for display, on the user interface, a notification based on updating the reference data.

3. The method of claim 2, wherein the first attribute describes a first type of user identifier, and wherein the second attribute describes a second type of user identifier, and wherein the reference data maps the first type of user identifier to the second type of user identifier.

4. The method of claim 2, wherein the first attribute describes a first type of user setting, and wherein the second attribute describes a second type of user setting, and wherein the reference data maps the first type of user setting to the second type of user setting.

5. The method of claim 2, further comprising:
receiving, via the user interface, a third user request to update the user profile data; and
in response to receiving the second user request, retrieving the custom data structure.

6. The method of claim 2, further comprising:
determining that the first attribute and the second attribute correspond; and
generating the reference data that maps the first attribute to the second attribute in response to determining that the first attribute and the second attribute correspond.

7. The method of claim 2, further comprising:
in response to receiving the first user request to generate the custom data structure, determining that the custom data structure comprises the first data structure and the second data structure; and
in response to determining that the custom data structure comprises the first data structure and the second data structure, accessing:
a first remote issue link to a first server housing the first data structure; and
a second remote issue link to a second server housing the first data structure.

8. The method of claim 2, wherein generating the reference data further comprises:
determining the first attribute;
determining the second attribute; and
determining a rule set for automatically mapping the first attribute to the second attribute.

9. The method of claim 2, further comprising:
retrieving first content from the first attribute;
retrieving second content from the second attribute;
determining a semantic closeness between the first content and the second content;
comparing the semantic closeness to a threshold semantic closeness;
determining that the first content and the second content correspond based on the semantic closeness equaling or exceeding the threshold semantic closeness; and determining that the first attribute and the second attribute correspond based on the semantic closeness equaling or exceeding the threshold semantic closeness.

10. The method of claim 2, further comprising:
retrieving first content from the first attribute;
determining a keyword in the first content;
comparing the keyword to a list of keywords corresponding to the second attribute; and
determining that the first attribute and the second attribute correspond based on comparing the keyword to the list of keywords corresponding to the second attribute.

11. The method of claim 2, further comprising:
receiving a user edit to the reference data; and
storing the edited reference data in the custom data structure.

12. One or more non-transitory, computer-readable media comprising instructions that, when executed by one or more processors, cause operations comprising:
receiving, via a user interface, a first user request to generate a custom data structure for user profile data, wherein the custom data structure comprises relationships between attributes of the user profile data and data exchange assets in a connected graph data exchange database, wherein the connected graph data exchange database relates data items in a data store to a collection of nodes and edges, wherein nodes, in the collection of nodes, represent the data items in the data store, and wherein the edges represent relationships between the nodes;
retrieving a first data structure for the user profile data, wherein the first data structure comprises a first attribute for the connected graph data exchange database, and wherein the first data structure corresponds to a first node in the connected graph data exchange database;
retrieving a second data structure for a standardized data structure, wherein the second data structure comprises a second attribute for the connected graph data exchange database, and wherein the second data structure corresponds to a second node in the connected graph data exchange database;
generating a custom attribute for including in the custom data structure based on reference data that maps the first attribute to the second attribute;
receiving, via the user interface, a second user request to update the second data structure in response to receiving the second user request, updating the reference data; and
generating for display, on the user interface, a notification based on updating the reference data.

13. The one or more non-transitory, computer-readable media of claim 12, wherein the first attribute describes a first type of user identifier, and wherein the second attribute describes a second type of user identifier, and wherein the reference data maps the first type of user identifier to the second type of user identifier.

14. The one or more non-transitory, computer-readable media of claim 12, wherein the instructions further cause operations comprising:
receiving, via the user interface, a third user request to update the user profile data; and
in response to receiving the second user request, retrieving the custom data structure.

15. The one or more non-transitory, computer-readable media of claim 12, wherein the instructions further cause operations comprising:

determining that the first attribute and the second attribute correspond; and generating the reference data that maps the first attribute to the second attribute in response to determining that the first attribute and the second attribute correspond.

16. The one or more non-transitory, computer-readable media of claim 12, wherein the instructions further cause operations comprising:

in response to receiving the first user request to generate the custom data structure, determining that the custom data structure comprises the first data structure and the second data structure; and in response to determining that the custom data structure comprises the first data structure and the second data structure, accessing:

a first remote issue link to a first server housing the first data structure; and a second remote issue link to a second server housing the first data structure.

17. The one or more non-transitory, computer-readable media of claim 12, wherein generating the reference data further comprises:

determining the first attribute;

determining the second attribute; and determining a rule set for automatically mapping the first attribute to the second attribute.

18. The one or more non-transitory, computer-readable media of claim 12, wherein the instructions further cause operations comprising:

retrieving first content from the first attribute;

retrieving second content from the second attribute;

determining a semantic closeness between the first content and the second content;

comparing the semantic closeness to a threshold semantic closeness;

determining that the first content and the second content correspond based on the semantic closeness equaling or exceeding the threshold semantic closeness; and determining that the first attribute and the second attribute correspond based on the semantic closeness equaling or exceeding the threshold semantic closeness.

19. The one or more non-transitory, computer-readable media of claim 12, wherein the instructions further cause operations comprising:

retrieving first content from the first attribute;

determining a keyword in the first content;

comparing the keyword to a list of keywords corresponding to the second attribute; and determining that the first attribute and the second attribute correspond based on comparing the keyword to the list of keywords corresponding to the second attribute.

20. The one or more non-transitory, computer-readable media of claim 12, wherein the instructions further cause operations comprising:

receiving a user edit to the reference data; and storing the edited reference data in the custom data structure.

\* \* \* \* \*